UNITED STATES PATENT OFFICE.

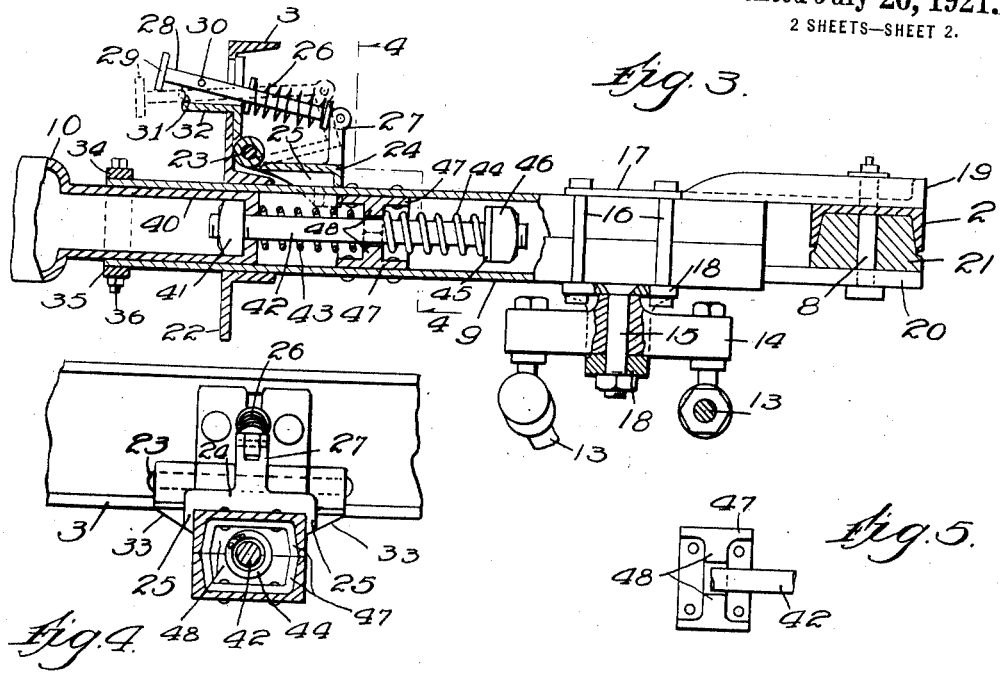
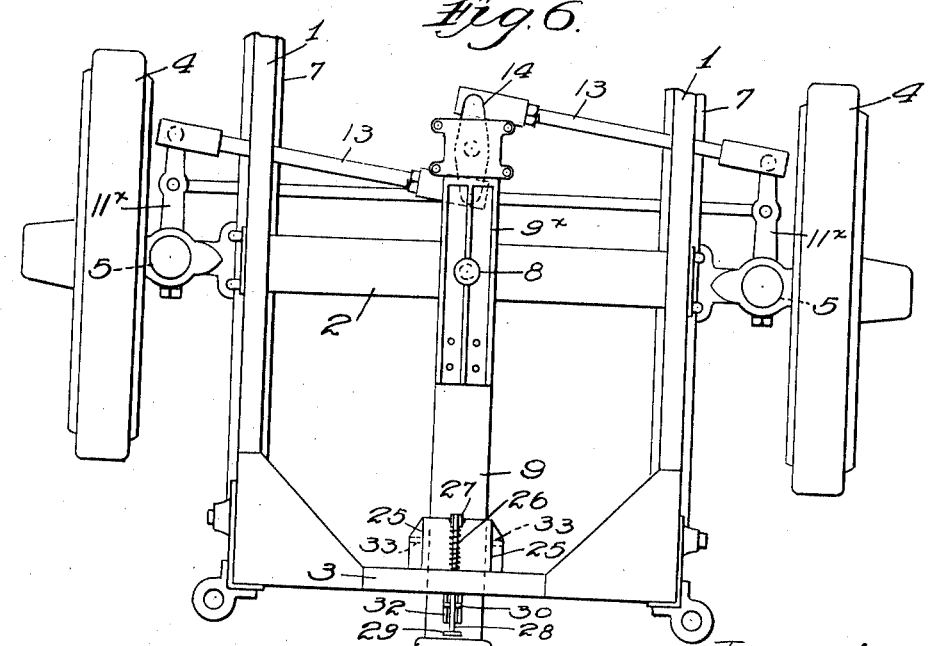

CHARLES G. CLEMENT, OF EDGERTON, WISCONSIN, ASSIGNOR TO HIGHWAY TRAILER COMPANY, OF EDGERTON, WISCONSIN, A CORPORATION OF WISCONSIN.

STEERING AND COUPLING CONNECTIONS FOR TRAILER-VEHICLES.

1,385,361.  Specification of Letters Patent.  Patented July 26, 1921.

Application filed April 16, 1919. Serial No. 290,420.

*To all whom it may concern:*

Be it known that I, CHARLES G. CLEMENT, a citizen of the United States, residing at Edgerton, in the county of Rock and State of Wisconsin, have invented certain new and useful Improvements in Steering and Coupling Connections for Trailer-Vehicles, of which the following is a specification, reference being had to the accompanying drawings, forming a part thereof.

This invention relates to coupling and steering connections for trailer vehicles adapted to be hauled by automobile trucks over ordinary roads, and it is directed especially to providing control of the steering gear of a trailer through the draw bar by which it is attached to the truck ahead. It consists in the various features and elements hereinafter described and shown in the drawings as indicated by the claims.

In the drawings:—

Fig. 3 is a detail section on a larger scale, taken as indicated at line 3—3 on Fig. 2 to show various features of the draw-bar construction.

Fig. 4 is a detail section taken as indicated at line 4—4 on Fig. 3.

Fig. 5 is a detail view of certain internal parts of the draw-bar.

Fig. 6 is a plan view like Fig. 2, but showing a modified arrangement of the steering connections with respect to the draw-bar.

Figure 1:
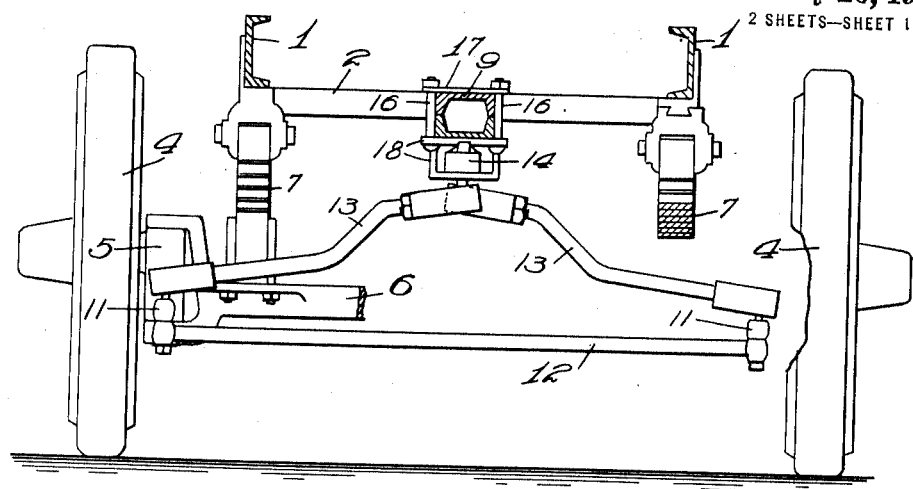
Figure 1 is a transverse elevation, partly in section, showing one end of the frame and running gear of a trailer vehicle provided with coupling and steering devices embodying this invention.

It may be understood that the trailer vehicle to which this invention relates is provided with a running gear designed along lines similar to those of automobiles and motor trucks and including four wheels, all of which are steering wheels, but specially arranged so that the rear pair of wheels may be locked in straight-ahead position so as to confine the steering adjustment to the forward wheels when the vehicle is in use. The drawings therefore illustrate only one end of a frame and running gear of such a vehicle, since the opposite end would be substantially similar in construction and arrangement. As seen in Fig. 1, the frame comprises side members, 1, connected by a cross member, 2, and a transverse end member, 3, and the wheels, 4, are carried on stub axles projecting from spindles, 5, pivotally mounted in the forked ends of the axle, 6, which supports the frame and vehicle body through springs, 7, shown as of the usual multiple-leaf, semi-elliptic type. Through a pivot, 8, a draw bar, 9, is connected to the cross member, 2, and said draw bar carries a coupler, 10, positioned on its outer end beyond the transverse frame member, 3.

Ordinarily the trailer vehicle is connected to the motor truck or other vehicle ahead by means of a draft pole and coupling connections hereinafter described, engaging with the coupler, 10, said draft pole being pivotally connected at its forward end to the vehicle which is to haul the trailer. Thus as the hauling vehicle deviates from a straight-ahead course, the draw-bar, 9, will tend to be swung to one side or the other about its pivot, 8, and this movement may be untilized for controlling the steering wheels, 4. Each of the spindles, 5, is furnished with the usual spindle arm, 11, and said arms are arranged to act in unison through the medium of a connecting rod, 12. Since the draw bar, 9, is located in a horizontal plane considerably above that of the spindle arms, 11, and since the draw bar is associated with the cross member, 2, of the frame, while the spindle arms, 11, are integral parts of the axle assembly which is yieldingly connected with the frame through springs, 7, it is not feasible to provide a single operating link between the draw bar, 9, and one of the spindle arms, 11, for transmitting steering movement from the draw bar to the wheels, 4, because the up-and-down movement of the vehicle frame and body upon its springs, 7, causing the draw bar, 9, to move vertically with respect to the axle, 6, would vary the angular relation between such a link and its connected parts, tending to move the steering wheels, 4, out of a straight-ahead path without any corresponding movement of the draw-bar, 9, in its horizontal plane, and thus causing a wabbling movement of the wheels, 4, of an obviously objectionable nature.

To avoid any disturbance of the proper relation of the steering connection by the up-and-down play of the vehicle frame with respect to the axle upon the springs, the draw bar, 9, is connected to each of the spindle arms, 11, by an individual connecting link, 13, and through the medium of a shorter equalizer bar, 14, which is mounted on the draw-bar, 9, by means of a pivot, 15, at its mid point, and which has the links, 13, pivotally connected to its opposite ends respectively. Thus when the flexing of the springs, 7, permits the axle, 6, to approach the plane of the draw bar, 9, the temporarily excessive length of the links, 13, is entirely absorbed or compensated in movement of their inner ends about the pivot, 15, without any resulting displacement of the pivot, 15, and draw bar, 9, or any resulting movement of the spindle arms, 11, and steering wheels, 4; for by virtue of the connecting rod, 12, the outward thrust of the links, 13, is equally resisted at both sides, that is, by both of the arms, 11, and the only result of the up-and-down play between the axle and the frame is the slight rotation of the equalizer or compensating lever, 14. However, when a positive lateral movement of the draw bar, 9, about its pivot, 8, swings the pivot, 15, to one side or the other, this movement is transmitted equally to opposite ends of the equalizer, 14, and the desired adjustment of the steering wheels, 4, takes place.

For convenience of construction, the draw bar, 9, is composed of two channel bars, assembled with the edges of their flanges abutting each other, and partially held together by clamping bolts, 16, extending from a plate, 17, on top of the assembled bars, and through holes in the upper wall of a housing, 18, which encompasses the equalizer, 14, and provides a mounting for its pivot bolt, 15. It will be understood that the steering links, 13, are provided with ball joints at both ends by which they are connected both to the spindle arms, 11, and to the equalizer, 14, so as to accommodate themselves to the spring action of the vehicle frame. At the inner end of the draw bar, 9, terminal members, 19 and 20, are secured to the channel members by rivets and extend above and below the cross member, 2, as shown in Fig. 3. Preferably a filler block, 21, is provided as a bearing for the pivot member, 8, which engages both terminals, 19 and 20, and transmits the draw-bar pull therefrom to the trailer frame.

At its forward end the draw-bar, 9, passes under the transverse frame member, 3, and is supported on a guide member, 22. For locking the wheels, 4, in straight-ahead position when they happen to constitute the rear pair of wheels of the trailer vehicle, there is hinged to the frame member, 3, at 23, a lock member, 24, having lateral flanges, 25, adapted to depend at opposite sides of the draw bar 9, when it is positioned at the middle of the width of the vehicle frame. A spring, 26, reacting between the frame member, 3, and an arm, 27, of of the lock member, 24, serves to retain the latter in locked position, but for releasing it to permit the steering action of the draw-bar, 9, there is provided a pull-rod, 28, connected to said arm, 27, and extending through the spring, 26, and through an aperture in the frame, 3, to the outer face thereof. Said rod, 28, is formed with a knob or handle, 29, and has a cross-pin, 30, which when the rod is pulled, may be engaged in a notch, 31, of a bracket, 32, extending from the outer face of the frame member, 3, in which position the rod, 28, serves to hold the locking member, 24, in position with its guard flanges, 25, elevated above the plane of the draw-bar, 9, and thus avoiding engagement therewith. As shown in Fig. 4, the member, 24, is provided with a cam portion, 33, sloping laterally upward from the lower edge of each of the guard flanges, 25, so that if the draw bar, 9, should not happen to be in straight-ahead position when the member, 24, is dropped into locking position, one of said cam portions, 33, will ride up over the draw bar as the latter is swung to its middle position, the spring, 26, effecting a locking engagement when the proper relation between the draw bar, 9, and the locking member is reached.

At its extreme outer end the draw bar, 9, is provided with a yoke, 34, and clevis, 35, connected by clamping bolts, 36, to hold the channel bars in proper relation, and within said channel bars and extending from them is secured a coupler comprising two vertical walls, 4, horizontally spaced apart and connected near their forward ends by a cross bolt, 5, designed for engagement with a coupling device on the draft pole about to be described. Said side walls, 4, are also connected at a point considerably below the cross bolt, 5, by a draft ring, 6.

Figure 2:
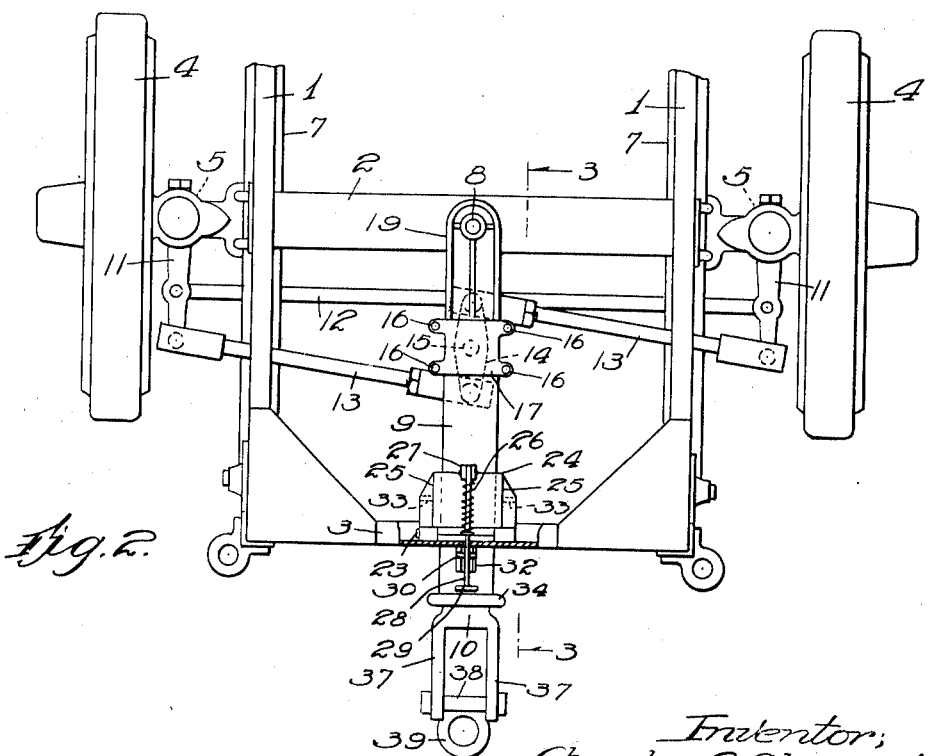
Fig. 2 is a top plan view of the frame and running gear at one end of such trailer vehicle.

As a slight modification of the structure shown in Fig. 2, Fig. 6 illustrates one end of a trailer frame in which the steering spindles, $11^x$, extend rearwardly, that is, toward the middle of the truck instead of toward the near end as in Fig. 2. They are coupled by the connecting rod, $12^x$, and steering adjustments are arranged to be effected through duplicate links, 13, and an equalizer, 14, exactly similar to the corresponding parts above described, but said equalizer, 14, is fulcrumed on an extension, $9^x$, of the draw bar, 9, projecting from its fulcrum pin, 8, toward the middle portion of the truck. It will be evident that the mode of operation is not materially altered by this change in location of the equalizer, 14.

Figs. 3, 4 and 5 reveal the interior structure of the draw bar by which the coupler head, 10, is yieldingly secured thereto. Said coupler is formed with a hollow shank, 40, in which is pocketed a square nut, 41, on a round bar, or rod, 42, extending therefrom into the space between the channels which form the draw bar, 9. Cushion springs, 43 and 44, are coiled about the rod, 42, and its inner end is fitted with a washer, 45, and nut, 46, forming a stop for spring, 44. A two-piece diaphragm or partition is provided in the draw bar by castings having foot flanges, 47, secured by rivets and webs, 48, extending toward each other across the interior of the draw bar, but each having a semi-circular opening, which combine to accommodate the rod, 42, while the webs, 48, serve as stops for the cushion springs, 43 and 44.

The push or pull upon the coupler, 10, is thus transmitted through its shank, 40, either to the spring, 43, or through the rod, 42, and its nut, 46, to the spring, 44, and thence through the webs, 48, of the castings, to the channels of the draw bar, 9.

I claim:—

1. In a vehicle, the combination with a vehicle frame and a fixed axle having steering yokes, steering knuckles pivoted to said yokes, arms fast to said knuckles and tie bar connecting the outer ends of said arms and thus maintained generally parallel with said axle, of steering arms fast to said knuckles, a draft bar pivoted to the vehicle frame, a drag rocker pivoted centrally of its length to said draft bar and extending substantially parallel to said bar when the vehicle moves in a straight line, and drag links connecting the opposite ends of said drag rocker to the outer ends of said steering arms.

2. In a vehicle, the combination, with a vehicle frame and a fixed axle, said axle having steering yokes, steering knuckles pivoted to said yokes, and a tie bar having connections to said yokes, causing them to move together, of a steering arm fast to said steering knuckle, a draft bar pivoted to the vehicle frame, a drag rocker pivoted centrally of its length to the draft bar, and two drag links respectively pivoted to the outer ends of said steering arms and to the opposite ends of said drag rocker.

3. In a vehicle, the combination, with a vehicle frame and a fixed axle having steering yokes, of steering knuckles pivoted to said yokes, a steering arm fast to each of said knuckles, a draft bar pivoted to the vehicle frame, a drag rocker pivoted centrally of its length to the draft bar, drag links connecting said steering arms to opposite ends of said drag rocker, and means for compelling said knuckles to rotate to equal extents around said yokes.

4. In a vehicle, the combination, with a vehicle frame and a fixed axle, of wheel holding devices pivoted to the ends of said axle, a steering arm fast to each of said wheel holding devices, a draft bar pivoted to the vehicle frame, a drag rocker pivoted centrally of its length to said draft bar, links connecting the outer ends of said drag rocker respectively to said steering arms, and means for compelling said wheel holding devices to rotate to equal extent around the ends of said axles.

5. In a vehicle, the combination, with a vehicle frame and a fixed axle, and wheel holding devices pivoted to the ends of said axle, of steering arms fast to said wheel holding devices, a draft bar pivoted to said vehicle frame, a drag rocker pivoted centrally of its length to the draft bar, drag links pivoted to the steering arms and to the drag rocker at opposite sides of its pivot on the draft bar, the pivotal point of the drag rocker to the draft bar being substantially in the straight line joining the pivots of the steering arms and the drag links, and means connecting the steering arms constructed to compel the wheel holding devices to rotate around the ends of the axle.

6. In a vehicle, the combination, with a vehicle frame and an axle, with wheel holding devices pivoted to the ends of said axle, of means for tying said wheel holding devices together and thus compelling them to rotate around the ends of said axle, a draft bar pivoted to the vehicle frame, and means connecting said wheel holding devices to said draft bars at a distance from the pivot of said draft bar to said frame.

7. In a vehicle, the combination, with a vehicle frame and an axle, and wheel holding means pivoted to the ends of said axle, of means for tying said wheel holding devices together and thus compelling them to rotate around the ends of said axle, a draft bar pivoted to the vehicle frame, at a point above said axle, means connecting said draft bar to said wheel holding devices, said means slanting upwardly as the draft bar is approached and constructed to permit relative vertical movement of said axle and said frame while maintaining said wheel holding devices in parallel relation to each other.

8. In a vehicle, the combination, with a vehicle frame and a fixed axle, with springs by which said axle resiliently supports said frame, of wheel holding devices pivoted to said axle at its ends, means tying said wheel holding devices and compelling them to rotate around the ends of said axle, a draft bar pivoted to said frame, means connecting said draft bar to said wheel holding devices, said means including links approaching each other at an obtuse angle adjacent the draft bar, the connection of said links to said draft bar and to said wheel holding devices permitting relative vertical movement of said draft bar and said axle.

9. In a vehicle, the combination, with a vehicle frame and an axle, the wheel holding means pivoted to the ends of said axle, of means for tying said wheels together whereby they are compelled to rotate around the ends of the axle to similar extents, a draft bar pivoted to the vehicle frame, a drag rocker pivoted to said draft bar, means connecting said drag rocker at opposite sides of its pivot to the wheel holding devices respectively, the drag rocker permitting the draft bar to bisect the angle between the wheels at all angles of the wheels to the vehicle frame.

10. In combination with a vehicle comprising a frame, road wheels adjustable in unison with respect to said frame for steering the vehicle, and supporting springs interposed between said wheels and the frame; a steering control member fulcrumed on the frame and connections therefrom to said wheels for conveying steering; means comprising lever arms extending from the respective wheel bearings; a pair of links connected to said lever arms respectively, and extending in general transversely of the length of the vehicle toward each other; an equalizer lever fulcrumed on the control member and extending transversely of the general direction of said links, and connected at opposite sides of its fulcrum to said links respectively.

11. In a vehicle comprising a frame, an axle, supporting springs connecting said parts, said axle having jointed end portions and wheels thereon adapted to be steered by adjustment of said jointed axle portions, means connecting said jointed axle ends to cause them to move in unison for steering adjustment, a laterally movable member on the frame; links connected to said movable parts of said pointed axle ends respectively, and extending in general transversely of the length of the vehicle toward each other, and an equalizer lever fulcrumed on said member and extending transversely of the general direction of said links, and pivotally connected at opposite sides of its fulcrum to said links respectively.

12. In a trailer vehicle comprising a frame, an axle, supporting springs connecting said parts, said axle having jointed end portions and wheels thereon adapted to be steered by adjustment of said jointed axle portions, means connecting said jointed axle ends to cause them to move in unison for steering adjustment, a draw bar adapted for coupling pivotally mounted on the frame; links connected to the movable parts of said jointed axle ends respectively, and an equalizer lever fulcrumed on said draw-bar and extending transversely of the general direction of said links, the links being pivotally connected to said lever at opposite sides of its fulcrum.

13. In a trailer vehicle comprising a frame, an axle, supporting springs connecting said parts, said axle comprising steering knuckles having vertically swiveled spindles and horizontally extending spindle arms; a transverse connecting rod coupling said spindle arms for movement in unison, a pair of links pivotally engaging said arms respectively, a draw bar fulcrumed on the frame in a plane above that of the spindle arms with its fulcrum substantially in the vertical plane of the said knuckle spindles, and a fore-and-aft extending equalizer lever carried on said draw bar by a vertical pivot substantially in the vertical plane of the pivotal connections of said links to said spindle arms, said links being respectively connected at their opposite ends to said equalizer lever at opposite sides of its pivot.

14. In a vehicle adapted for use as a trailer, having wheels carried on a jointed axle for steering adjustment, a draw-bar pivotally attached to the frame and connected with the respective axle members for steering control, means for locking the drawbar at will in straight-ahead position, comprising a member hinged to extend horizontally from the middle of a transverse frame member over the draw bar and remote from its pivot, said member having lateral guard flanges depending at both sides of said bar to retain it at the middle of its range of movement.

15. In the combination set forth in claim 14, the locked member being yieldingly retained in locking position and being formed with laterally facing inclined surfaces adapted for encounter with the draw bar when the latter is moved to its middle position from a position at one side thereof, whereby said locking member is vertically displaced to admit the draw bar to such middle position, but is yieldingly returned for automatically locking the draw bar.

16. In the combination set forth in claim 14, said locking member being carried on a transverse frame member within the periphery of the frame, and being yieldingly retained in locking position, and a handle extending outside said periphery of the frame and connected for withdrawing said locking member from locking position.

17. In the combination set forth in claim 16, means associated with said handle connection, and controlled by said handle, adapted for retaining the parts in position with the locking member withdrawn from engagement with the draw bar to permit free transverse play of the latter.

18. In combination with the parts set forth in claim 14, the locking member being hinged to the inner face of the transverse frame member, a link connected to said hinged locking member and extending through an aperture in said transverse frame member past the outer surface thereof, said link being formed to be manually grasped for releasing the locking member, and said link and the frame member being provided with coöperating abutments arranged to be engaged for holding the lock in released position.

19. In the combination of claim 18, a compression spring coiled about said link, and reacting between the hinged locking member and the transverse frame member for yieldingly retaining said lock in position to control the draw bar.

In testimony whereof, I have hereunto set my hand at Chicago, Illinois, this 14th day of April, A. D. 1919.

CHARLES G. CLEMENT.